United States Patent
Kudo et al.

(10) Patent No.: US 7,981,333 B2
(45) Date of Patent: Jul. 19, 2011

(54) METHOD OF SETTING MOLD CLAMPING FORCE OF INJECTION MOLDING MACHINE

(75) Inventors: Yoshiaki Kudo, Nagano-ken (JP);
Takashi Hakoda, Nagano-ken (JP);
Kiyoshi Nakamura, Nagano-ken (JP);
Susumu Morozumi, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 12/610,869

(22) Filed: Nov. 2, 2009

(65) Prior Publication Data

US 2010/0109183 A1 May 6, 2010

(30) Foreign Application Priority Data

Nov. 6, 2008 (JP) ................................ P2008-285419

(51) Int. Cl.
*B29C 45/80* (2006.01)
(52) U.S. Cl. ...................... 264/40.5; 264/328.1; 425/150
(58) Field of Classification Search ................. 264/40.1, 264/40.5, 328.1; 700/200, 203; 425/150
See application file for complete search history.

(56) References Cited

U.S. PATENT DOCUMENTS

| | | | | |
|---|---|---|---|---|
| 4,131,596 A | * | 12/1978 | Allen | 264/40.5 |
| 4,913,638 A | * | 4/1990 | Buja | 425/140 |
| 4,942,004 A | * | 7/1990 | Catanzaro | 264/40.5 |
| 5,493,503 A | * | 2/1996 | Richards et al. | 700/200 |
| 6,048,476 A | * | 4/2000 | Lausenhammer et al. | 264/40.5 |
| 6,562,265 B2 | * | 5/2003 | Usui et al. | 264/40.5 |
| 7,037,452 B1 | * | 5/2006 | Speight | 264/40.1 |

FOREIGN PATENT DOCUMENTS

| JP | 2003-320569 | * 11/2003 |
|---|---|---|
| JP | 3833140 B2 | 11/2003 |

OTHER PUBLICATIONS

Electronic translation of Japanese reference 2003-320569.*

* cited by examiner

*Primary Examiner* — Jill L Heitbrink
(74) *Attorney, Agent, or Firm* — Knoble Yoshida & Dunleavy, LLC (57) ABSTRACT

Test molding is performed by sequentially clamping a mold 2 with a mold clamping force (100%, 80%, 70%, ...) obtained by sequentially lowering a mold clamping force by a predetermined amount from the maximum mold clamping force (100%); with mold position sensors 4 provided on outer surfaces $3cf$ and $3mf$ of a fixed platen $3c$ supporting a fixed mold $2c$ of the mold 2 and a movable platen $3m$ supporting a movable mold $2m$ of the mold 2, a relative position (mold position $Xc$) of the movable platen $3m$ with respect to the fixed platen $3c$ in an injection process is detected; and, when at least a variation that meets predetermined conditions is produced on the mold position $Xc$, a mold clamping force obtained by increasing a mold clamping force at a time of occurrence of the variation by a predetermined amount is set as a proper mold clamping force $Fs$.

12 Claims, 7 Drawing Sheets

METHOD OF SETTING MOLD CLAMPING FORCE OF INJECTION MOLDING MACHINE

TECHNICAL FIELD

The present invention relates to a method of setting a mold clamping force of an injection molding machine, and such a method is suitably used to set a mold clamping force smaller than the maximum mold clamping force when a mold is clamped by a mold clamping device.

BACKGROUND ART

An injection molding machine is generally provided with a mold clamping device for clamping a mold. In this type of mold clamping device, for example, a high-pressure mold clamping is performed at the maximum mold clamping force of the mold clamping device to achieve secure clamping without the occurrence of flash or the like; however, since an excessive mold clamping force is applied to the mold, the mold is degraded earlier and consumption energy is unnecessarily increased, and stains, such as weld marks, burns and black streaks, and damages on the surface of cavities are produced due to insufficient gas removal, with the result that it is necessary to perform repair process. Thus, if a mold can be clamped with a required minimum mold clamping force, that is, a proper mold clamping force, it is possible to avoid an excessive mold clamping force added to the mold, with the result that it is possible to extend the life of the mold, reduce the consumption energy and avoid the interruption of production and the like.

Conventionally, as the above-described method of setting a proper mold clamping force, a method of setting a mold clamping force of an injection molding machine disclosed in patent document 1 proposed by the applicant of the present invention has been already known. The method of setting a mold clamping force disclosed in patent document 1 is a method of setting a mold clamping force of an injection molding machine in which a force for clamping the mold attached to the mold clamping device is set. In this method, the mold clamping force is varied to 1/Nth (N>1) the force at a time from the maximum mold clamping force in a sequential manner; tentative molding is performed at each mold clamping force; the opening of a movable mold at a time of the tentative molding is detected from the amount of reverse rotation of a drive motor for applying pressure to the movable mold; when the opening of the movable mold is detected, the mold clamping force is varied to M times (1<M<N) the force at a time in a sequential manner; after the opening of the movable mold, a mold clamping force when the movable mold is not opened for the first time or a mold clamping force obtained by adding a predetermined extra force to such a mold clamping force is determined; and the obtained mold clamping force is set at a specified mold clamping force.

SUMMARY OF INVENTION

Technical Problem

However, the above-described conventional method of setting a mold clamping force of an injection molding machine suffers from the following problems to be solved.

Firstly, since the opening of a mold is detected, it is insufficient in terms of determining a proper mold clamping force. Specifically, the opening of a mold means that flash occurs; it is not necessarily appropriate as information used to determine a proper mold clamping force before the occurrence of flash. Thus, since, in consideration of variations in mold clamping force or the like, for example, an extra force (mold clamping force) added is inevitably increased, it is necessary to achieve further improvement in terms of setting a proper (appropriate) mold clamping force.

Secondly, since the opening of a mold is detected, it is impossible to obtain comprehensive information on the deformation of a mold or the like. Specifically, since the deformation of the mold around its center is detected, the displacement (the opening) of a movable mold is only detected as information on the position of the mold. Thus, since the method is not utilized when the effects of the deformation or the like of the mold at the time of an item being molded are analyzed (examined), it is necessary to achieve further improvement in terms of obtaining more comprehensive mold information

Solution to Problem

To overcome the above problems, according to one aspect of the present invention, there is provided a method of setting a mold clamping force of an injection molding machine M that sets a mold clamping force smaller than the maximum mold clamping force when a mold 2 is clamped by a mold clamping device Mc, in which test molding is performed by sequentially clamping the mold 2 with a mold clamping force (100%, 80%, 70%, . . . ) obtained by sequentially lowering a mold clamping force by a predetermined amount from the maximum mold clamping force (100%); with mold position sensors 4 provided on outer surfaces $3cf$ and $3mf$ of a fixed platen $3c$ supporting a fixed mold $2c$ of the mold 2 and a movable platen $3m$ supporting a movable mold $2m$ of the mold 2, a relative position (mold position Xc) of the movable platen $3m$ with respect to the fixed platen $3c$ in an injection process is detected; and, when it is detected that at least a variation that meets predetermined conditions is produced on the mold position Xc, a mold clamping force obtained by increasing a mold clamping force at a time of occurrence of the variation by a predetermined amount is set as a proper mold clamping force Fs.

In the present invention, the variation of the mold position Xc resulting from the deformation of the mold 2 in the injection process is detected, and the detection results are utilized for the setting of the proper mold clamping force Fs. Since, in the injection process, the mold clamping pressure and the resin pressure act on the mold 2 in the directions opposite to each other, when the mold clamping pressure is somewhat smaller than a mold clamping pressure corresponding to the maximum mold clamping force but is larger than the resin pressure, the mold 2 in a closed condition is deformed by the resin pressure. In the present invention, the mold position sensors 4 are provided on outer surfaces $3cf$ and $3mf$ of the fixed platen $3c$ and the movable platen $3m$, and the relative position (the mold position Xc) of the movable platen $3m$ with respect to the fixed platen $3c$ is detected, and thus the deformation of the mold 2 by the resin pressure, specifically, an abnormal phenomenon in which the mold position Xc is varied in the reverse direction (in the closed direction) before the opening of the mold 2 is detected, with the result that the proper mold clamping force that avoids the occurrence of flash is set.

Advantageous Effects of Invention

With the method of setting a mold clamping force of the injection molding machine M according to the present invention, the following significant benefits are obtained.

(1) Since the mold position Xc in the injection process is detected by the mold position sensors 4 provided on the outer surfaces $3cf$ and $3mf$ of the fixed platen $3c$ supporting the fixed mold $2c$ and the movable platen $3m$ supporting the movable mold $2m$, it is possible not only to reliably set, by utilizing information on the deformation of the mold 2 or the like, the required minimum proper mold clamping force Fs with which no flash occurs but also to easily achieve automatic setting.

(2) It is possible to obtain information on the deformation of the mold 2 resulting from the filling of the resin, especially, information on the deformation of the mold 2 when the mold 2 is closed; in other words, it is possible to obtain comprehensive information on the variation of the mold. Thus, it is possible to widely utilize the information such as when the effects of the deformation and the like of the mold are analyzed (examined) at the time of the molding of an item.

(3) According to one preferred aspect, when, as a variation that meets predetermined conditions, a variation that is equal to or less than the lower limit threshold value Xcd set by subtracting a predetermined offset value from the mold position Xc at the time of the completion of mold clamping is applied, before the opening of the mold 2, that is, based on the state before the occurrence of flash, the lower limit threshold value Xcd can be utilized as the first warning about the likelihood of the occurrence of flash, with the result that it is possible to accurately set the proper mold clamping force Fs.

(4) According to another preferred aspect, when, as a variation that meets predetermined conditions, a variation that is equal to or more than the upper limit threshold value Xcu set by adding a predetermined offset value to the mold position Xc at the time of the completion of mold clamping is applied, after the opening of the mold 2, that is, the upper limit threshold value Xcu can be utilized as the second warning about the likelihood of the occurrence of flash. Thus, it is possible to perform the detection with the upper limit threshold value Xcu to accurately set the required proper mold clamping force Fs even when the mold position Xc is not varied so as to be equal to or less than the lower limit threshold value Xcd.

(5) According to another preferred aspect, as a mold clamping force obtained by increasing the mold clamping force by a predetermined amount, the immediately set mold clamping force is used, and thus it is possible to easily and accurately set the proper mold clamping force Fs by utilizing the immediately preceding mold clamping force with which flash has been already found to be prevented from occurring.

(6) According to another preferred aspect, when the mold clamping force is sequentially lowered to a mold clamping force (100%, 80%, . . . ) from the maximum mold clamping force (100%), the limit value Fd is set, and then if a variation that meets predetermined conditions is not produced even when the mold clamping force reaches the limit value Fd, the limit value Fd is set as the proper mold clamping force Fs. Thus, it is possible to set a proper mold clamping force reflecting the actual quality of a molded item (the thickness, weight and the like of the molded item) and other factors such as energy saving effects.

(7) According to another preferred aspect, the detection signal Dxn obtained from the mold position sensor 4 is filtered by the filter processing portion 5 to remove noise, and thus it is possible to obtain the accurate mold position Xc whose noise is removed, with the result that it is possible to facilitate the more accurate and stable setting of the proper mold clamping force Fs.

DESCRIPTION OF EMBODIMENTS

The present invention will now be described in detail, using a preferred embodiment of the present invention, based on the accompanying drawings. The accompanying drawings are not used for specifying the present invention but are used to make the invention easily understood. The detailed description of known parts will be omitted so as not to make the invention unclear.

The configuration of an injection molding machine M that can perform a method of setting a mold clamping force according to this embodiment will first be described with reference to FIGS. 1 and 2.

Figure 2:
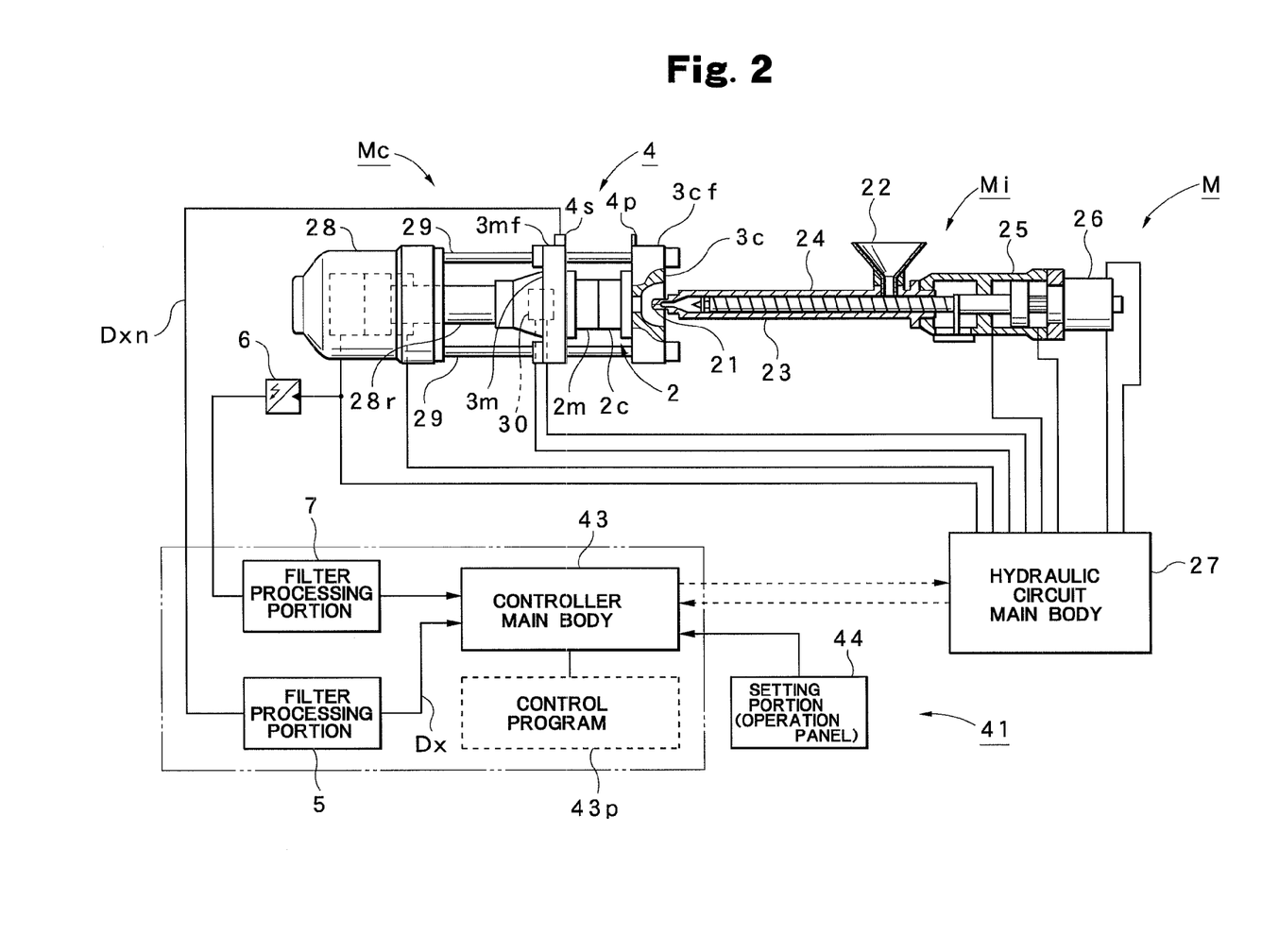
FIG. 2 is a diagram showing the configuration of an injection molding machine that can perform the method of setting a mold clamping force.

In FIG. 2, the reference numeral M represents an injection molding machine, and it is provided with an injection device Mi and a mold clamping device Mc. The injection device Mi is provided with a heating cylinder 23 that has an injection nozzle 21 at the front end and a hopper 22 for material supply at the rear portion; the heating cylinder 23 incorporates a screw 24. At the rear portion of the heating cylinder 23, an injection cylinder 25 and a measurement motor (oil motor) 26 are provided; the injection cylinder 25 and the measurement motor 26 are connected to a hydraulic circuit main body 27 including a hydraulic pump and various switching valves. On the other hand, the mold clamping device Mc is provided with a fixed platen $3c$ installed on an unillustrated machine stage and a mold clamping cylinder 28 installed away from the fixed platen $3c$. Between the fixed platen $3c$ and the clamping cylinder 28, four divers 29 . . . are provided; a movable platen 3m is slidably loaded onto these divers 29 . . . . Thus, the movable platen 3m has bearing hole portions through which the divers 29 . . . are inserted. The end of a ram 28r protruding from the clamping cylinder 28 is coupled with the rear surface of the movable platen 3m. A fixed mold 2c is supported by the fixed platen 3c, and a movable mold 2m is supported by the movable platen 3m; the fixed mold 2c and the movable mold 2m constitute a mold 2. The clamping cylinder 28 and a protrusion cylinder 30 incorporated in the movable platen 3m are connected to the hydraulic circuit main body 27.

On the other hand, the reference numeral 41 represents a molding machine controller. The molding machine controller 41 is provided with a controller main body 41 having a computer function; this controller main body 43 incorporates a CPU that performs various types of control processing and computation processing and the like and a memory that can store various types of data and the like, and stores a control program 43p that can realize the method of setting a mold clamping force, described later and according to this embodiment. The reference numeral 44 represents a setting portion (an operation panel) attached to the controller main body 43; the setting portion can perform various settings. In this setting portion 44, display is achieved on a display attached thereto and the display employs a touch panel method.

A mold position sensor 4 with which the method of setting a mold clamping force according to this embodiment is practiced is connected to the molding machine controller 41. The mold position sensor 4 is formed with a combination of: a distance measurement sensor portion 4s that utilizes an ultrasonic sensor or the like attached to the outer surface 3mf of the movable platen 3m; and a plate-to-be-detected portion 4p attached to the outer surface 3cf of the fixed platen 3c. With respect to this mold position sensor 4, a plurality of pairs of mold position sensors 4 are preferably provided at a plurality of different positions in terms of obtaining the average value. A detection signal Dxn obtained from the mold position sensor 4 (the distance measurement sensor portion 4s) is supplied to the controller main body 43 through a filter processing portion 5 that removes noise. For filtering performed by the filter processing portion 5, a moving average method or a moving least-squares method can be used. Thus, a detection signal Dx obtained from the filter processing portion 5 by removing noise is detected as a position of the movable platen 3m relative to the fixed platen 3c, that is, a mold position Xc. As described above, the detection signal Dxn obtained from the mold position sensor 4 is filtered by the filter processing portion 5 to remove noise, and thus it is possible to obtain the accurate mold position Xc whose noise is removed, with the result that it is possible to facilitate the more accurate and stable setting of the proper mold clamping force Fs. Although a non-contact type distance measurement sensor (position sensor) is described as an example of the mold position sensor 4, a contact type position sensor of linear scale or the like may be used or various types of sensors that can perform similar detection on the mold position Xc can be utilized. The reference numeral 6 represents a mold clamping sensor that detects a hydraulic pressure of a rear hydraulic compartment of the clamping cylinder 28 to obtain a mold clamping pressure; the mold clamping sensor 6 is connected to the controller main body 43 through a filter processing portion 7. The filter processing portion 7 can be configured similar to the filter processing portion 5.

The method of setting a mold clamping force with the injection molding machine M according to this embodiment will now be described with reference to FIGS. 1 to 9.

Figure 5:
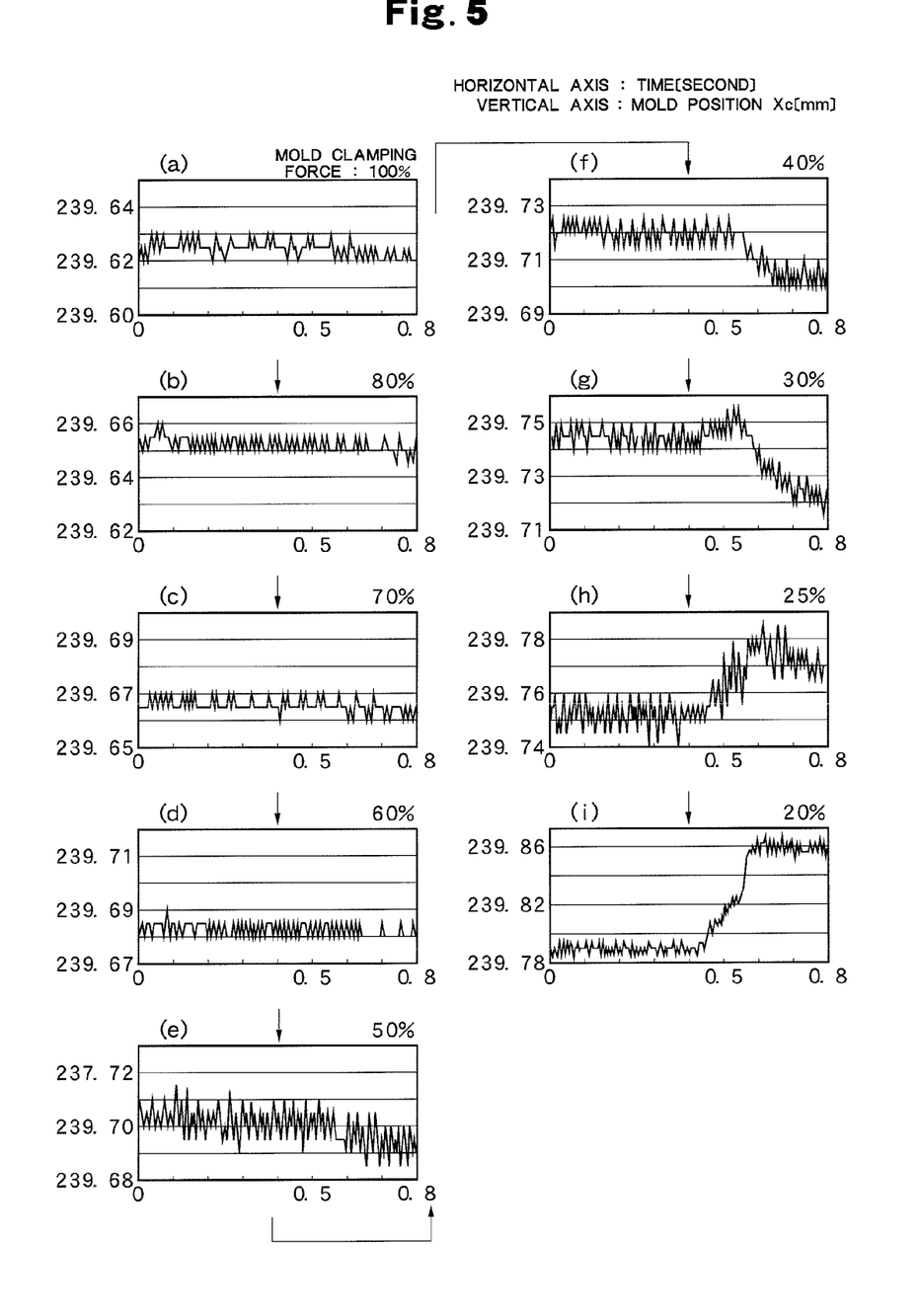
FIG. 5 is a characteristic diagram showing the variation of the position of a mold with respect to time at each mold clamping force in order to show the principle of the method of setting a mold clamping force.

The principle of the method of setting a mold clamping force according to this embodiment will first be described with reference to FIGS. 1 and 5.

FIGS. 5(a) to 5(i) show the variation of the mold position Xc (mm) when test-molding is performed, and especially show, after the mold 2 is clamped by the mold clamping device Mc, a characteristic of the variation of the mold position Xc (mm) detected by the mold position sensor 4 with a period of time (second) of an injection process where resin is injected and filled from the injection device Mi into the mold 2; FIGS. 5(a) to 5(i) show cases where the mold clamping force is set at 100% (the maximum mold clamping force), 80%, 70%, 60%, 50%, 40%, 30%, 25% and 20%.

Figures 1A, 1B, 1C:
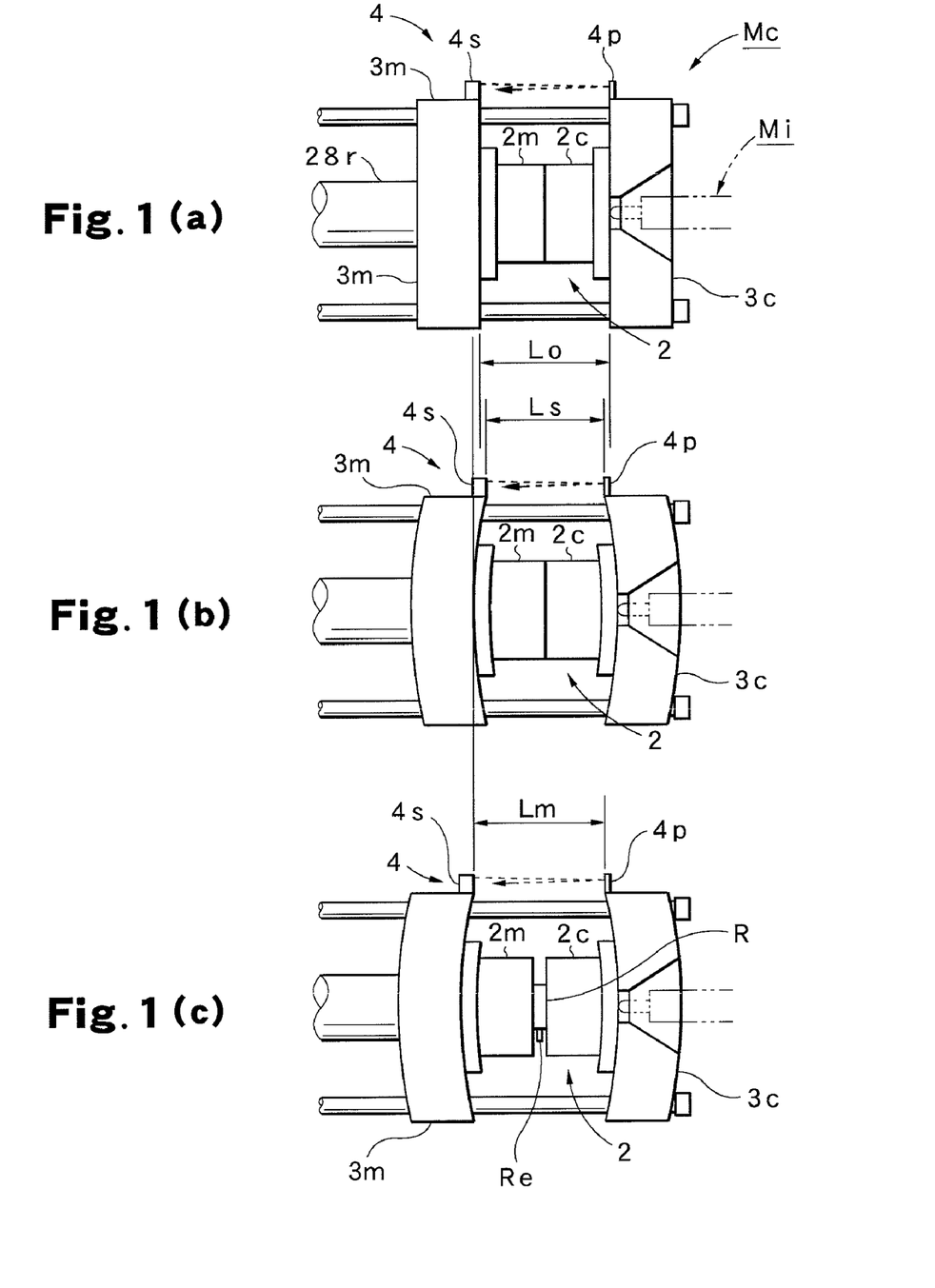
FIG. 1 is a schematic diagram of a mold clamping device showing the principle of a method of setting a mold clamping force according to a preferred embodiment of the present invention.

As is obvious from FIGS. 5(a) to 5(d), since, when the mold clamping force falls with a range of 60 to 100%, the mold clamping force is relatively large, the mold 2 is little affected by the resin pressure, and thus the mold position Xc remains almost the same. The condition of the mold 2 in this case is shown in FIG. 1(a). The symbol Lo represents the space between the movable platen 3m and the fixed platen 3c measured by the mold position sensor 4. On the other hand, in a case where the mold clamping force is 50% as shown in FIG. 5(e), it is observed that, halfway through the injection/filling process, the mold position Xc is varied in a closed direction (the reverse direction), and this continues until a case where the mold clamping force is 30% as shown in FIG. 5(g). This is probably because, as shown in FIG. 1(b), since, even when the mold 2 is closed, the mold clamping force is lowered, the mold 2 is deformed by the resin pressure, with the result that the center side of the mold 2 is expanded and the movable platen 3m and the fixed platen 3c are curved, and the outer surfaces 3mf and 3cf of the movable platen 3m and the fixed platen 3c are displaced in a direction (in a closed direction) in which they approach each other. In FIG. 1(b), the symbol Ls represents the space between the movable platen 3m and the fixed platen 3c measured by the mold position sensor 4; the space Ls is less than the space Lo shown in FIG. 1(a). As shown in FIGS. 5(h) and 5(i), when the mold clamping force is less than 25%, the mold position Xc is varied in an open direction halfway through the injection/filling process. This is because, since, as shown in FIG. 1(c), the resin pressure is greater than the mold clamping force, the movable mold 2m (the movable platen 3m) are pushed in the open direction and thus the mold 2 is opened. In FIG. 1(c), the symbol Lm represents the space between the movable platen 3m and the fixed platen 3c measured by the mold position sensor 4; the space Lm is greater than the space Lo shown in FIG. 1(a).

Thus, when the mold position sensors 4 provided on the outer surfaces 3cf and 3mf of the fixed platen 3c and the movable platen 3m are used, the relative position (the mold position Xc) of the movable platen 3m to the fixed platen 3c is detected, and thus it is possible not only to detect the opening of the mold 2 but also the deformation of the mold 2 by the resin pressure, and, more specifically, it is possible to detect an abnormal phenomenon in which the mold position Xc is varied in the reverse direction (in the closed direction) before the opening of the mold 2; the monitoring of the phenomena before and after the opening of the mold 2 makes it possible to set the proper mold clamping force Fs with which can prevent the occurrence of flash.

The method of setting a mold clamping force by utilizing the above-described principle according to this embodiment will now be described step by step.

The molding machine controller 41 is set to have a mold clamping force automatic setting mode. In the mold clamping force automatic setting mode, in order for the detected mold position Xc to be determined, the lower limit threshold value Xcd and the upper limit threshold value Xcu for the mold position Xc, and the limit value Fd for the mold clamping force are set. In this case, the lower limit threshold value Xcd is set by subtracting a mold position Xco at the time of completion of mold clamping from a predetermined offset value. The predetermined offset value can be set as a fixed value obtained from a pre-test or the like or can be freely set by a user in consideration of the condition of a molded item or the like. When the lower limit threshold value Xcd is set in this way, based on the condition of mold 2 before the opening of the mold 2, that is, before the occurrence of flash, the lower limit threshold value Xcd can be utilized as the first warning (flash warning 1) about the likelihood of the occurrence of flash.

The upper limit threshold value Xcu is set by adding a predetermined offset value to the mold position Xco at the time of completion of mold clamping. The predetermined offset value can be set as a fixed value obtained from a pre-test or the like or can be freely set by a user in consideration of the condition of a molded item or the like. When the upper limit threshold value Xcu is set in this way, the upper limit threshold value Xcu can be utilized as the second warning (flash warning 2) about the fact that flash occurs.

Figure 8:
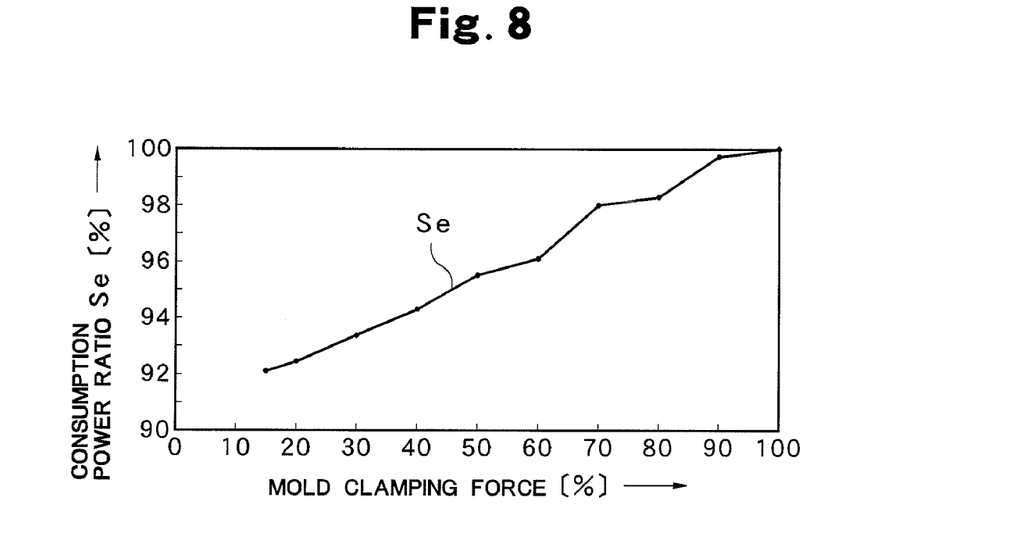
FIG. 8 is a characteristic diagram showing the variation of a consumption power ratio with respect to the mold clamping force when the mold clamping force is set lower in a sequential manner.
Figure 9:
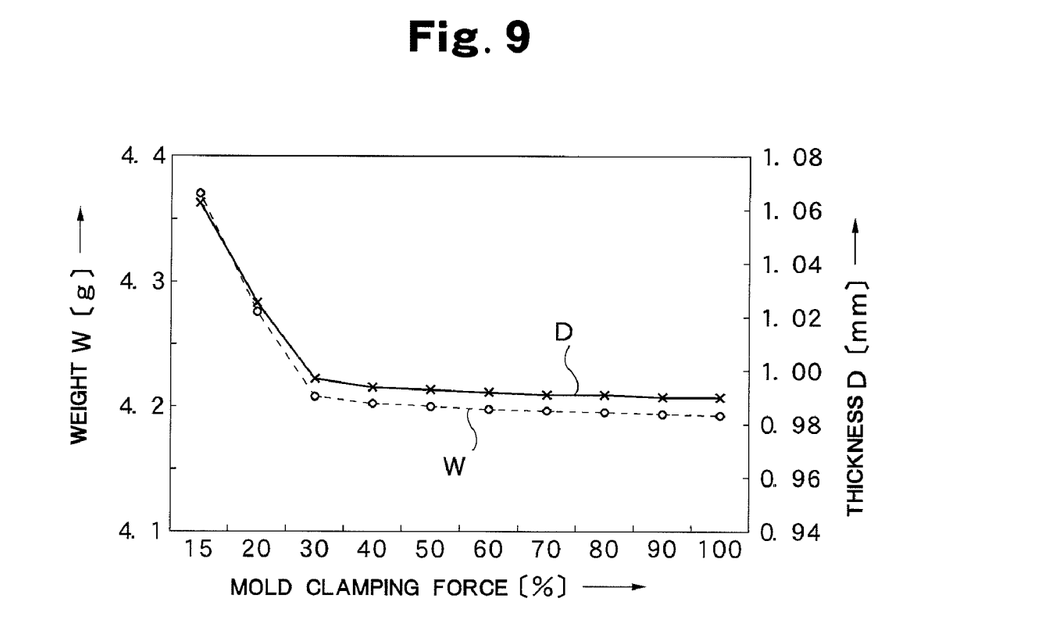
FIG. 9 is a characteristic diagram showing the variation of the weight and thickness of a molded item with respect to the mold clamping force when the mold clamping force is set lower in a sequential manner.

The limit value Fd is set for the mold clamping force (100%, 80%, . . . ) that is sequentially lowered from the maximum mold clamping force (100%). Even when the mold clamping force is reduced to, for example, 30%, depending on the mold, the mold position Xc may be varied such that it is neither equal to or less than the lower limit threshold value Xcd nor equal to or more than the upper limit threshold value Xcu. However, since, even in this case, adverse effects may be produced on other components, the limit value Fd can be set for the mold clamping force when it is lowered. For example, FIG. 8 shows a power consumption ratio Se (%) (ratio of the maximum mold clamping force to the power consumption) with respect to the mold clamping force obtained by sequentially lowering a predetermined amount from the maximum mold clamping force (100%); FIG. 9 shows the weight W (g) and the thickness D (mm) of a molded item with respect to the mold clamping force obtained by sequentially lowering a predetermined amount from the maximum mold clamping force (100%). In the case of the weight W (g) and the thickness D (mm) of a molded item, when the mold clamping force is less than 30%, the weight W (g) and the thickness D (mm) are rapidly varied. Thus, in this case, the limit value Fd is set at 30%, and thus it is possible not only to avoid unstable molding but also to set a proper mold clamping force reflecting the actual quality of a molded item and other factors such as energy saving effects.

Figure 3:
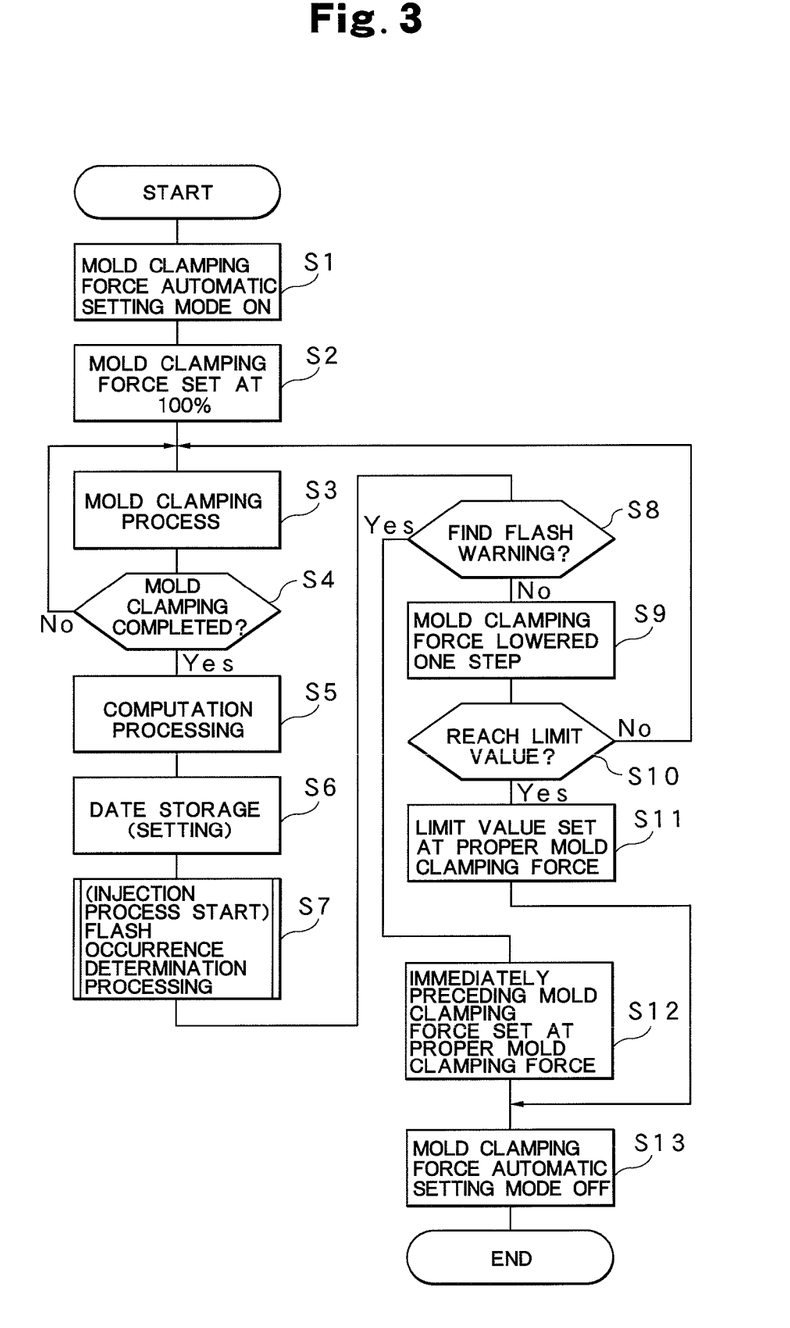
FIG. 3 is a flowchart showing the procedure of the method of setting a mold clamping force.
Figure 6:
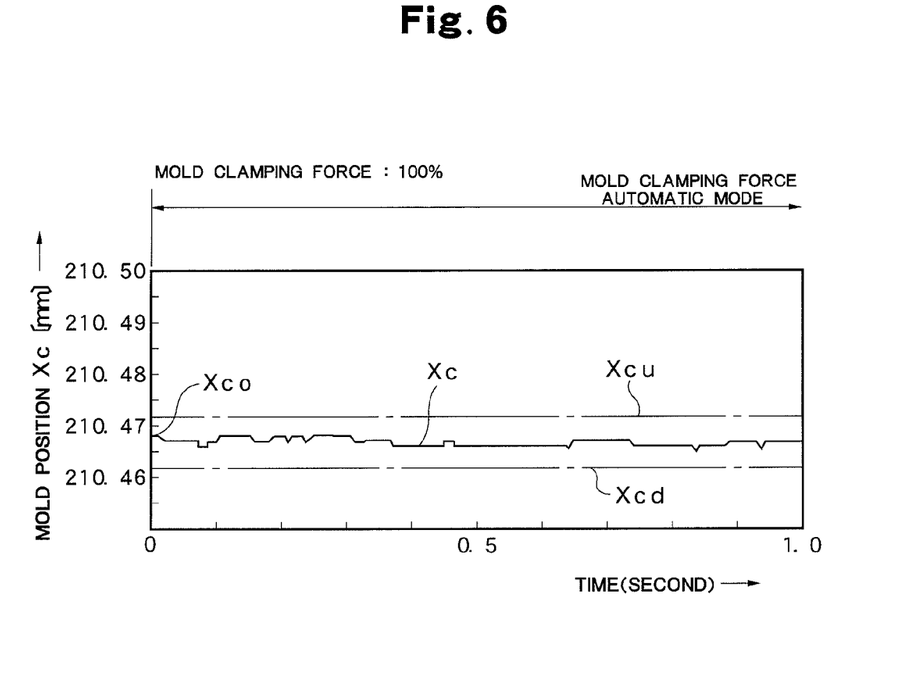
FIG. 6 is a characteristic diagram showing the variation of the position of the mold with respect to time when the method of setting a mold clamping force is performed with a 100% mold clamping force.
Figure 7:
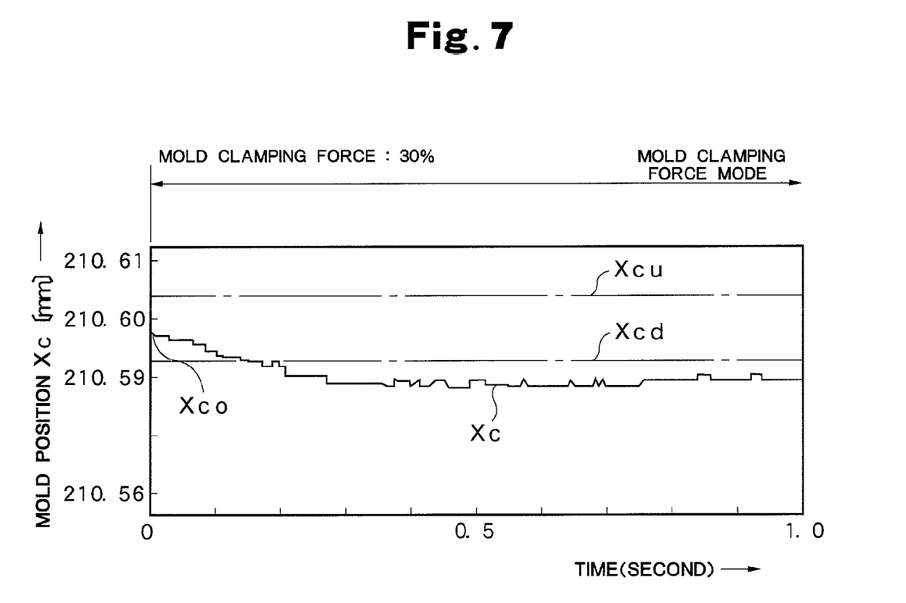
FIG. 7 is a characteristic diagram showing the variation of the position of the mold with respect to time when the method of setting a mold clamping force is performed with a 30% mold clamping force.

The procedure of the mold clamping force automatic setting mode will now be described with reference to flowcharts shown in FIGS. 3 and 4 and variation characteristics shown in FIGS. 6 and 7.

In the mold clamping force automatic setting mode, test molding is performed by sequentially clamping a mold with the mold clamping force (100%, 80%, 70%, . . . ) obtained by sequentially lowering a predetermined amount from the maximum mold clamping force (100%), and, with the mold position sensors 4 provided on the outer surfaces 3cf and 3mf of the fixed platen 3c supporting the fixed mold 2c and the movable platen 3m supporting the movable mold 2m, the relative position (the mold position Xc) of the movable platen 3m with respect to the fixed platen 3c in the injection process is detected, with the result that it is possible to automatically set, when a variation that meets predetermined conditions is produced on the mold position Xc, a mold clamping force obtained by increasing the mold clamping force at the time of the occurrence of such as variation by a predetermined amount as the proper mold clamping force Fs.

Figure 4:
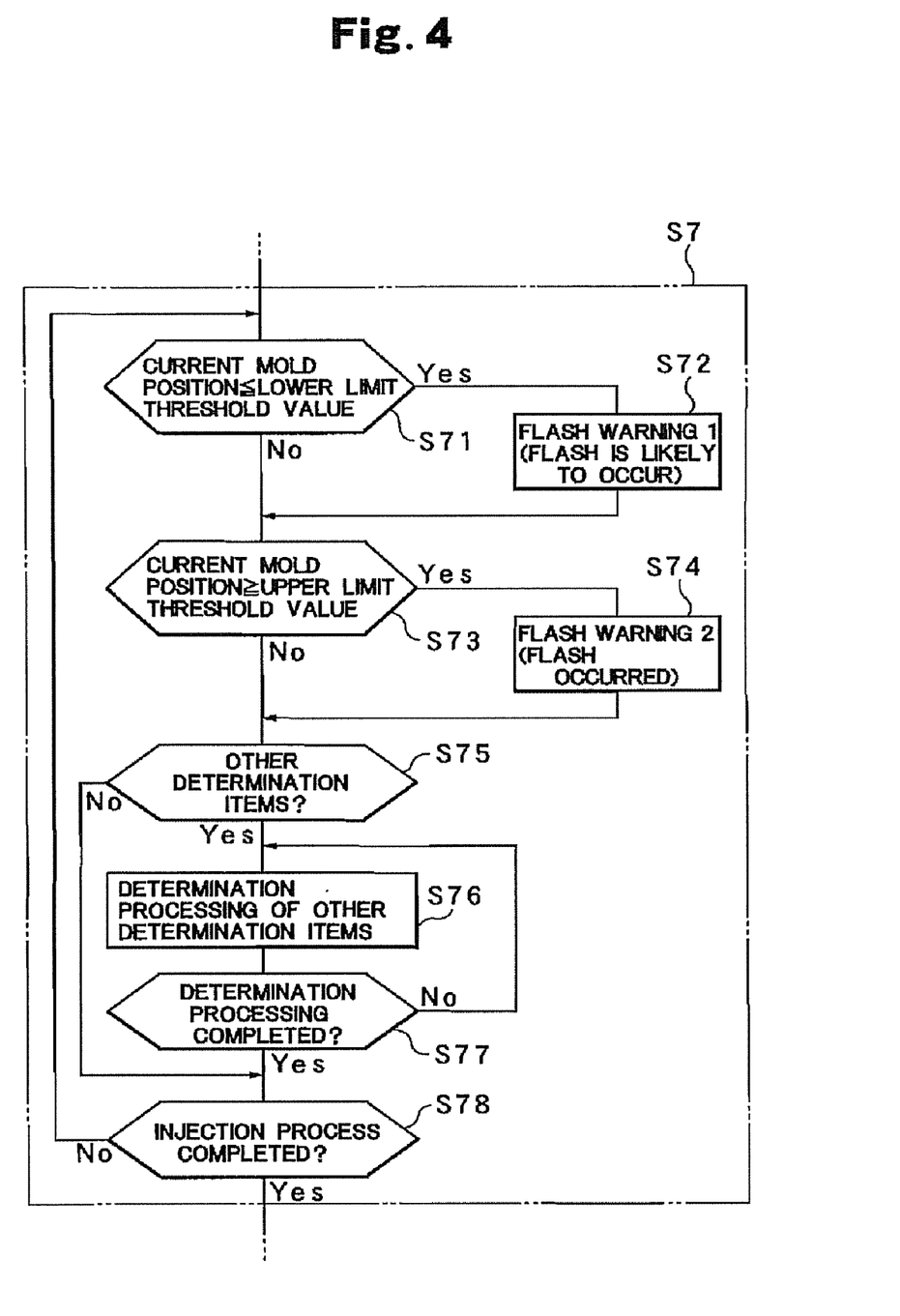
FIG. 4 is a part of the flowchart specifically showing the process of determining whether or not flash occurs.

The procedure will be specifically described below with reference to FIG. 3 (FIG. 4). First, in order for the mold clamping force automatic setting mode to be used, the mold clamping force automatic setting mode is selected (ON) from the setting portion (the operation panel) 44 (step 1). By doing so, the mold clamping force that is set is reset, and thus the mold clamping force is set at 100% (the maximum clamping force) (step 2). Then, a mold clamping process with 100% the mold clamping force is performed (step S3). After the completion of the mold clamping process, necessary computation processing is performed (steps S4 and S5). Specifically, the lower limit threshold value Xcd is determined through computation by subtracting a predetermined offset value from the mold position Xco at the time of mold clamping, and the upper limit threshold value Xcu is determined through computation by adding a predetermined offset value to the mold position Xco. Then, data determined by the computation is stored (set) in a memory (step S6). In FIG. 6 (FIG. 7), the lower limit threshold value Xcd and the upper limit threshold value Xcu that are set are represented by alternate long and short dashed lines. FIG. 6 shows a characteristic of the variation of the mold position Xc (mm) with respect to time (second) when the mold clamping force is set at 100%; the reference numeral Xco represents a time when the mold clamping is completed.

After the completion of the mold clamping process, the process proceeds to the injection process. In the injection process, the resin is injected and filled in the mold 2, and flash occurrence determination processing is performed (step 7). In FIG. 4, the specific procedure of the flash occurrence determination processing is shown. In the flash occurrence determination processing, whether or not a variation that meets predetermined conditions is produced on the mold position Xc detected by the mold position sensor 4 is monitored. More specifically, whether or not the mold position Xc (the current position) is equal to or less than the lower limit threshold value Xcd is determined (step S71). In this case, if it is equal to or less than the lower limit threshold value Xcd, the flash warning 1 is output (step S72). Whether or not the mold position Xc (the current position) is equal to or more than the upper limit threshold value Xcu is determined (step S73). In this case, if it is equal to or more than the upper limit threshold value Xcu, the flash warning 2 is output (step S74). If other determination items are set optionally or otherwise, determination processing on those determination items is performed (steps S75 and S76). The flash occurrence determination processing is continuously performed at a predetermined period until the completion of the injection process (steps S77 and S78).

Then, after the completion of the injection process (the flash occurrence determination processing), whether or not the flash warning is output is checked (step S8). When the mold clamping force shown in FIG. 6 is 100% (the maximum mold clamping force), since the detected mold position Xc exceeds the lower limit threshold value Xcd and is kept less than the upper limit threshold value Xcu, no flash warning is output. Thus, in this case, the mold clamping force is one-step lowered to be set at 80% (step S9). Here, if the set mold clamping force does not exceed the limit value Fd, the mold clamping process is performed with the mold clamping force of 80%, and the test molding is performed and the flash occurrence determination processing is performed (steps S10 and S3 to S10). Consequently, as long as the detected mold position Xc exceeds the lower limit threshold value Xcd and is kept less than the upper limit threshold value Xcu, the mold clamping force is sequentially lowered to 70%, 60%, 50%, . . . , and the same processing is repeatedly performed.

On the other hand, if the mold position Xc is equal or less than the lower limit threshold value Xcd and/or is equal to or more than the upper limit threshold value Xcu, in order for the flash warning 1 and/or the flash warning 2 to be output, the immediately preceding mold clamping force is set as the proper mold clamping force Fs (steps S8 and S12). For example, FIG. 7 shows a case where, when the mold clamping force is 30%, the mold position Xc is equal to or less than the lower limit threshold value Xcd; in this case, the flash warning 1 is supposed to be output and thus if at least one flash warning is output, the subsequent test molding is not performed and the immediately preceding mold clamping force (in the case of the example, 40%) is set as the proper mold clamping force Fs. Hence, in the case of the example, a 10% increase is added to the mold clamping force of 30% and thus the mold clamping force is set at 40%. As described above, as a mold clamping force obtained by increasing the mold clamping force by a predetermined amount, the immediately set mold clamping force is used, and thus it is possible to easily and accurately set the proper mold clamping force Fs by utilizing the immediately preceding mold clamping force with which flash has been already found to be prevented from occurring. In this way, a series of settings is completed, and the mold clamping force automatic setting mode is turned off (step S13).

On the other hand, since the limit value Fd is set, for example, it is set at 40%, when the mold clamping force is lowered to 40%, the test molding is not performed thereafter, and the limit value Fd of 40% is set at the proper mold clamping force Fs (steps S10 and S11). As described above, when the mold clamping force is sequentially lowered to a mold clamping force (100%, 80%, 70%, . . . ) from the maximum mold clamping force (100%), the limit value Fd is set, and then if a variation that meets predetermined conditions is not produced even when the mold clamping force reaches the limit value Fd, the limit value Fd is set as the proper mold clamping force Fs. In this case, on the completion of the setting, the mold clamping force automatic setting mode is turned off (step S13).

In the method of setting a mold clamping force according to this embodiment, since the mold position Xc in the injection process is detected by the mold position sensors 4 provided on the outer surfaces 3cf and 3mf of the fixed platen 3c supporting the fixed mold 2c and the movable platen 3m supporting the movable mold 2m, it is possible not only to reliably set, by utilizing information on the position of the mold 2 including information related to the deformation of the mold 2 or the like, the required minimum proper mold clamping force Fs with which no flash occurs but also to easily achieve automatic setting. It is possible to obtain, for example, information on the deformation of the mold 2 resulting from the filling of the resin, especially, information on the deformation of the mold 2 when the mold 2 is closed; in other words, it is possible to obtain comprehensive information on the variation of the mold. Thus, it is possible to widely utilize the information such as when the effects of the deformation and the like of a mold are analyzed (examined) at the time of the molding of an item.

Although the preferred embodiment is described above in detail, the present invention is not limited to such an embodiment, and any modification, addition and deletion on detailed configurations, shapes, materials, quantities, values, methods (procedures) and the like are possible without departing from the spirit of the present invention. For example, the maximum mold clamping force does not indicate the ability of the mold clamping device Mc, and it means a mold clamping force that is generally used and that includes a rated mold clamping force. Although the above description deals with the case where, when a variation that meets predetermined conditions is produced, instead of the mold clamping force at the time of the occurrence of such a variation, the immediately preceding mold clamping force is set as the proper mold clamping force, the mold clamping force may be increased by adding a predetermined fixed value thereto or it may be increased by multiplying it by a predetermined factor. Although the above description deals with the case where the distance measurement sensor portion 4s is attached to the outer surface 3mf of the movable platen 3m and the plate-to-be-detected portion 4p is attached to the outer surface 3cf of the fixed platen 3c, the plate-to-be-detected portion 4p may be attached to the outer surface 3mf of the movable platen 3m, and the distance measurement sensor portion 4s may be attached to the outer surface 3cf of the fixed platen 3c.

INDUSTRIAL APPLICABILITY

The method of setting a mold clamping force according to the present invention can be applied to various injection molding machines such as the hydraulic injection molding machine incorporating the direct pressure type mold clamping device described above as an example, an injection molding machine incorporating a toggle type mold clamping device and electrically driven injection molding machine.

REFERENCE SIGNS LIST

2: Mold, 2c: Fixed mold, 2m: Movable mold, 3c: Fixed platen, 3m: Movable platen, 3cf: Outer surface of the fixed platen, 3mf: Outer surface of the movable platen, 4: Mold position sensor, 5: Filter processing portion, M: Injection molding machine, Mc: Mold clamping device, Xc: Mold position, Xco: Mold position at the time of completion of mold clamping, Xcd: lower limit threshold value, Xcu: upper limit threshold value, Dxn: Detection signal

CITATION LIST

Patent Literature 1

Japanese Patent No. 3833140

The invention claimed is:

1. A method of setting a mold clamping force of an injection molding machine that sets a mold clamping force smaller than a maximum mold clamping force when a mold is clamped by a mold clamping device; comprising the steps of:
setting a lower limit threshold value by subtracting a predetermined offset value from a mold completion position at a time of mold clamping;
placing at least a pair of position sensors on a first outer surface of a fixed platen supporting a fixed portion of the mold and a second outer surface of a movable platen supporting a movable portion of the mold;
sequentially clamping the mold with a mold clamping force obtained by sequentially lowering a mold clamping force by a predetermined amount from the maximum mold clamping force;
detecting a relative position of the movable platen with respect to the fixed platen in an injection process, the relative position reflecting deformation of the mold due to an undesirable pressure in the mold during an injection process; and properly adjusting a mold clamping force upon detecting the relative position having a certain value that is equal to or less than the predetermined lower limit threshold distance.

2. The method of setting a mold clamping force of an injection molding machine according to claim 1,
wherein, when the relative position having the certain value equal to or less than the lower limit threshold value is detected, a first warning is output.

3. The method of setting a mold clamping force of an injection molding machine according to claim 1,
wherein an upper limit threshold value is set by adding a predetermined offset value to a mold position at a time of mold clamping.

4. The method of setting a mold clamping force of an injection molding machine according to claim 3,
wherein, when the relative position having the certain value equal to or more than the upper limit threshold value is detected, a second warning is output.

5. The method of setting a mold clamping force of an injection molding machine according to claim 1,
wherein a limit value is set when the mold clamping force is sequentially lowered from the maximum mold clamping force, and, when the mold clamping force reaches the limit value and then the certain value is not detected, the limit value is set as the mold clamping force.

6. The method of setting a mold clamping force of an injection molding machine according to claim 5,
wherein the limit value is set based on at least one of a weight and a thickness of the molded.

7. The method of setting a mold clamping force of an injection molding machine according to claim 1,
wherein the mold position sensors further include a combination of a non-contact distance measurement sensor portion attached to the outer surface of the movable platen and a plate-to-be-detected portion that is attached to the outer surface of the fixed platen and that is thus detected by the non-contact distance measurement sensor portion.

8. The method of setting a mold clamping force of an injection molding machine according to claim 1,
wherein a plurality of pairs of the position sensors are provided at a plurality of different positions, and an average value of detection signals obtained from the plurality of pairs of the position sensors is used to detect the relative position.

9. The method of setting a mold clamping force of an injection molding machine according to claim 1,
wherein a filter processing portion performs filtering on detection signals obtained from the position sensors to eliminate noise.

10. The method of setting a mold clamping force of an injection molding machine according to claim 9,
wherein the filter processing portion performs the filtering with moving average.

11. The method of setting a mold clamping force of an injection molding machine according to claim 9,
wherein the filter processing portion performs the filtering with a moving least-squares method.

12. The method of setting a mold clamping force of an injection molding machine according to claim 1,
wherein the properly adjusted mold clamping force is automatically set by a predetermined mold clamping force automatic setting mode.

* * * * *